Aug. 11, 1953
T. W. ROLPH ET AL
2,648,763
LIGHT CONTROLLING REFRACTOR AND
LUMINAIRE USING THE SAME
Filed April 25, 1950
4 Sheets-Sheet 1
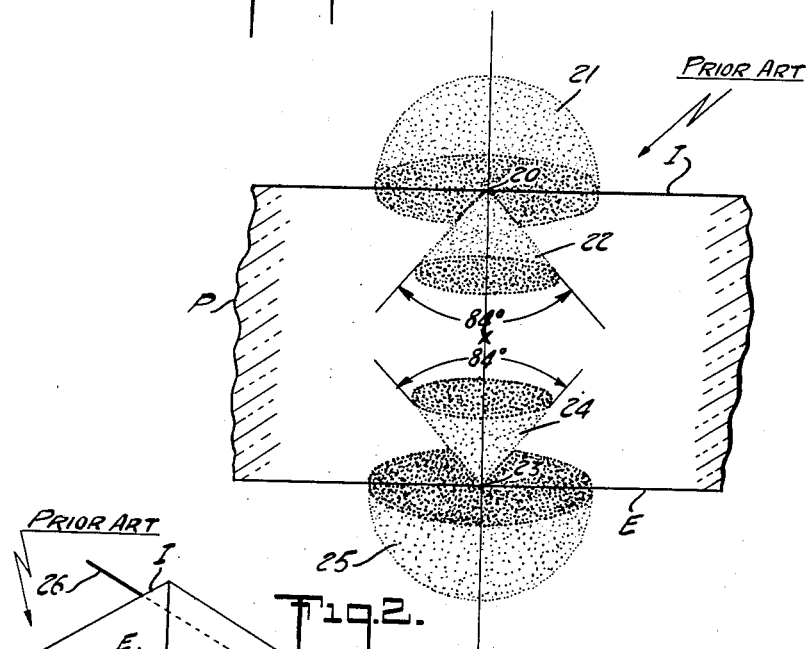
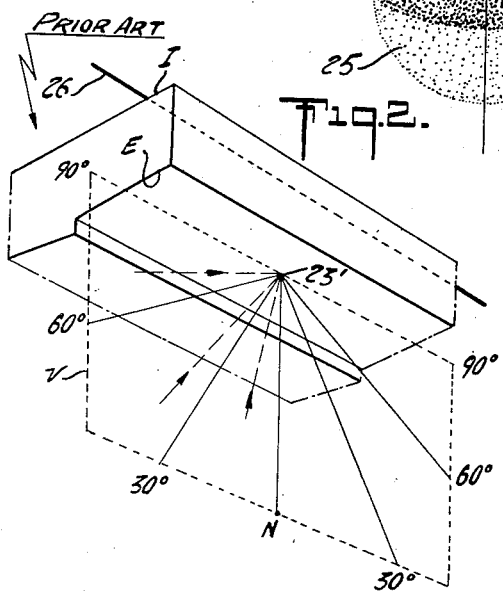
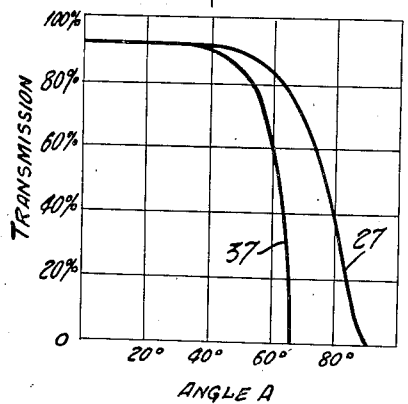
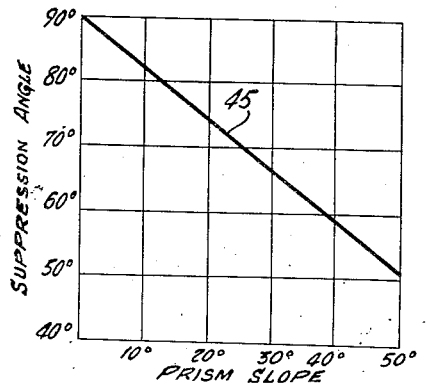
INVENTORS
KURT FRANCK and
THOMAS W. ROLPH
BY
John M. Cole.
ATTORNEY

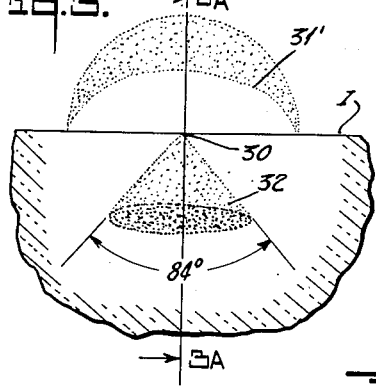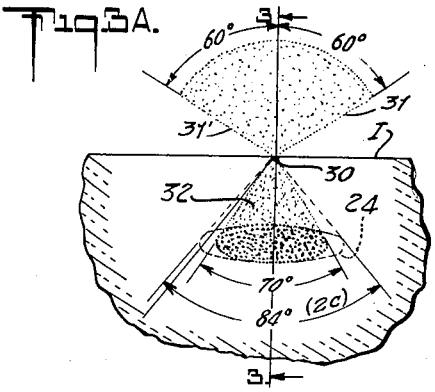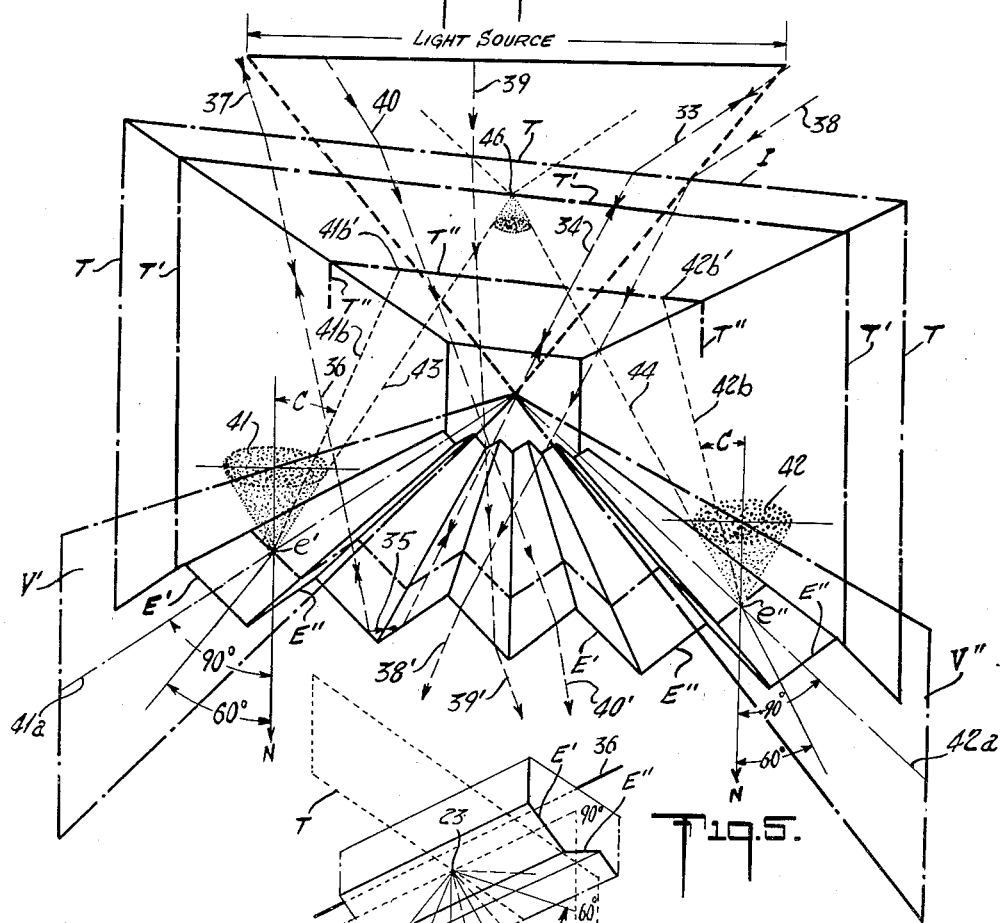

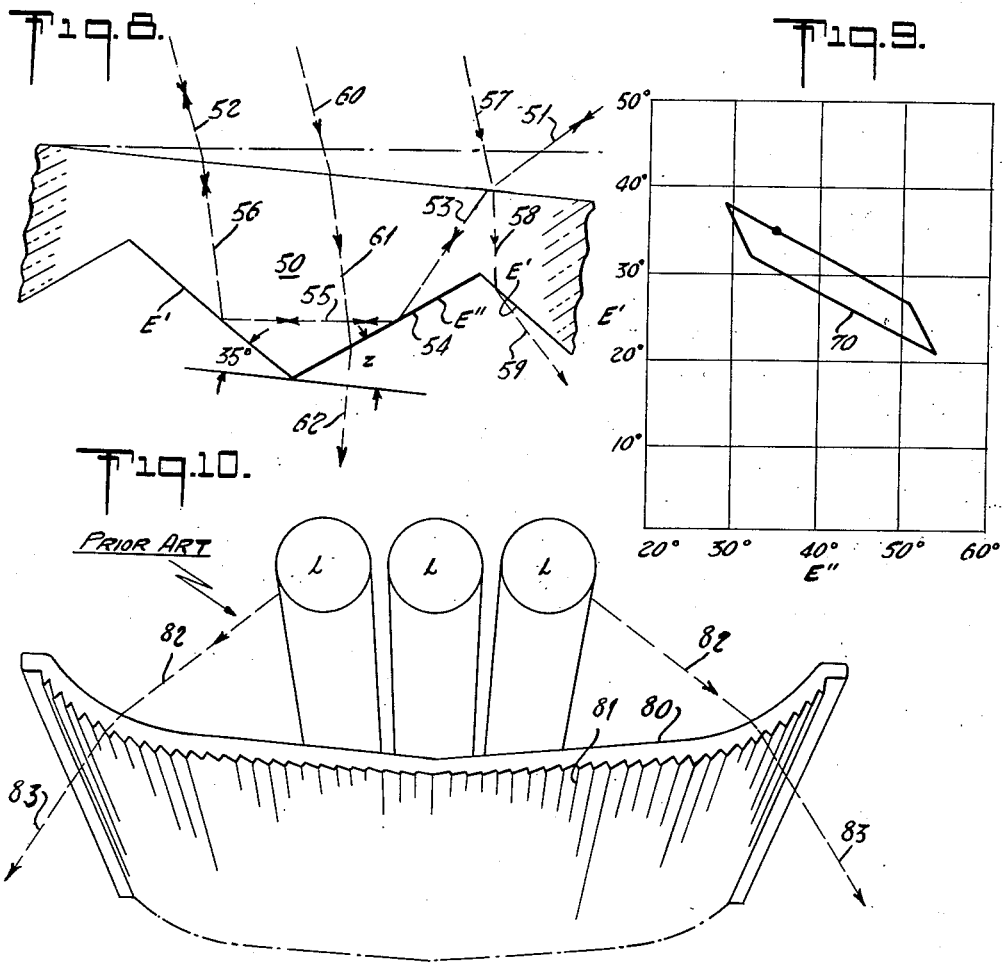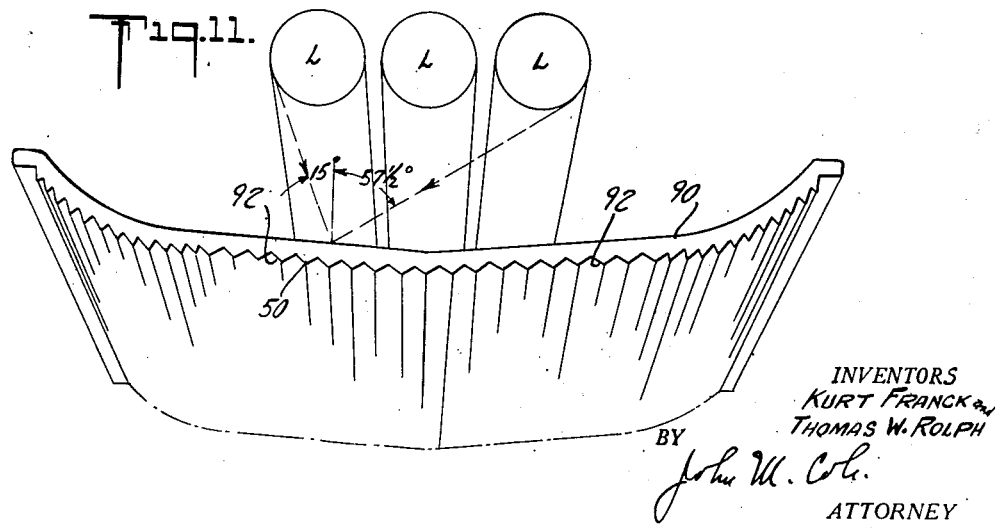

Patented Aug. 11, 1953

2,648,763

UNITED STATES PATENT OFFICE 2,648,763

LIGHT CONTROLLING REFRACTOR AND LUMINAIRE USING THE SAME

Thomas W. Rolph and Kurt Franck, Newark, Ohio, assignors to Holophane Company, Inc., New York, N. Y., a corporation of Delaware Application April 25, 1950, Serial No. 157,978

10 Claims. (Cl. 240—51.11)

The present invention relates to light controlling refractors and luminaires using the same.

Fluorescent lighting luminaires employing rectilinear light sources require shielding of the lamp or lamps to keep the lamps from direct observation and reduce brightness. This shielding is usually provided in both longitudinal and lateral directions. Brightness of fluorescent lighting luminaires employing light transmitting closures made of transparent or translucent material may be reduced by diffusion and the light redistributed into more useful directions for particular purposes by prisms. These prisms are customarily longitudinal prisms, as such prisms maintain the long lines of the lighting equipment and provide uniformity of appearance lengthwise of the lighting equipment. Longitudinal prisms and flutes have also been found very useful in effecting various types of transverse control of the light emitted by such fixtures, as shown for example in Rolph Patent 2,318,716, Franck Patents 2,368,014 and 2,474,308, and Wince Patent 2,474,341. Prismatic plates, of the type shown in these patents, employed below one or more lighting sources for the purpose of reducing the divergence of the direct light falling on them, have on each side of the median line a system of longitudinal prisms. These plates preferably have longitudinally extending flutes on the upper surface to effect diffusion of the light transversely.

In order to provide an intensive distribution pattern in transverse directions suitable for general illumination, it has been customary to use on the lower surface regressed, Fresnel-like prisms, relatively shallow and flat in the center of the plate and gradually steeper in slope the farther away they are located from the center of the plate. In longitudinal directions, the shallow prisms on the center of the plate do not effect light distribution to any appreciable extent. This is because the fluorescent lamp emits light longitudinally all the way up to 90° from the nadir and this light is transmitted directly into the glare zone, i. e., from 60° to 90° above the nadir so that surface brightness of such refractors in longitudinal directions has been found to be very high, nearly that of the bare lamps. There is a falling off of glare zone brightness in diagonal directions and in transverse directions, but appreciable brightnesses are experienced in these directions on account of back reflections.

The object of the present invention is to provide the light transmitting refractor below the light sources with a longitudinally extending configuration on its lower surface, which is effective to suppress the transmission of light in longitudinal directions in angles above approximately 60° to 66° from the nadir, and keep such light to the greatest possible extent out of this glare zone.

Inasmuch as the lighting equipment is viewed not only in longitudinal directions, but diagonally and transversely, the new plates present regions of possible brightness when viewed in the glare zone diagonally or transversely and it is a further object of the present invention to provide the light transmitting plates with configurations which in addition to suppressing the light in the glare zone longitudinally also suppress it in corresponding angles in diagonal and transverse directions.

According to the present invention, the lower surface of the transmitting plate, for a width at least equal but preferably slightly greater than the overall width of the multilamp light source employed in such fixtures, is provided with longitudinally extending, relatively narrow ribs having sloping faces which act singly on light endeavoring to escape in longitudinal vertical planes in the glare zone to suppress it and which act concurrently upon light which would otherwise escape in the glare zone to return it upwardly and prevent its transmission downwardly. The overall result of these longitudinally extending ribs is to a very large extent to confine the light output into regions below approximately 60° to 65° from the nadir.

For the purpose of illustrating the present invention, the drawings show optical phenomena occurring in prior art constructions and in the new construction, an embodiment of the invention in which the invention may take form, together with comparison data between the prior art and the improved construction, it being understood that the drawings are illustrative of the invention rather than limiting the same.

In these drawings:

Figure 1 is a sectional view normal to the incident and emergent surfaces of a light transmitting plate with parallel faces and illustrating optical action taking place by light passing through the same;

Figure 2 is a fragmentary perspective view showing the emission of light in a longitudinal vertical plane from the lower surface of a plate such as in Figure 1 and originating in a line source above the plate and in that plane;

Figure 12:
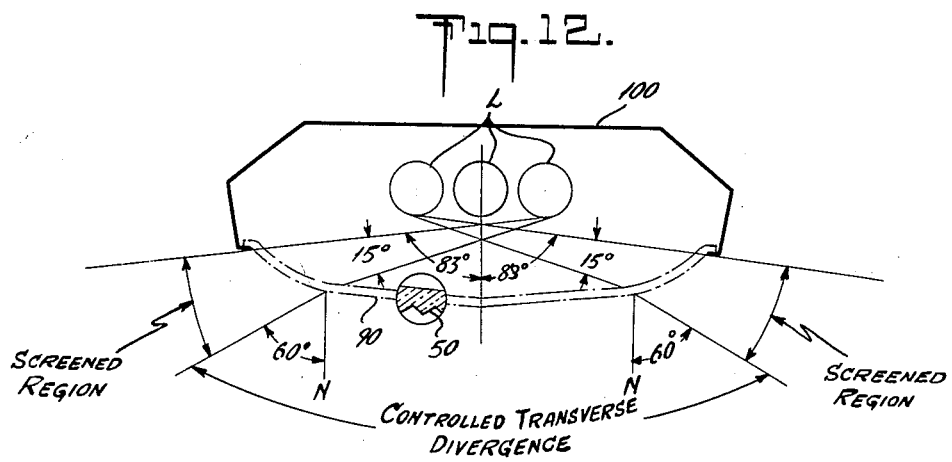
Figure 13:
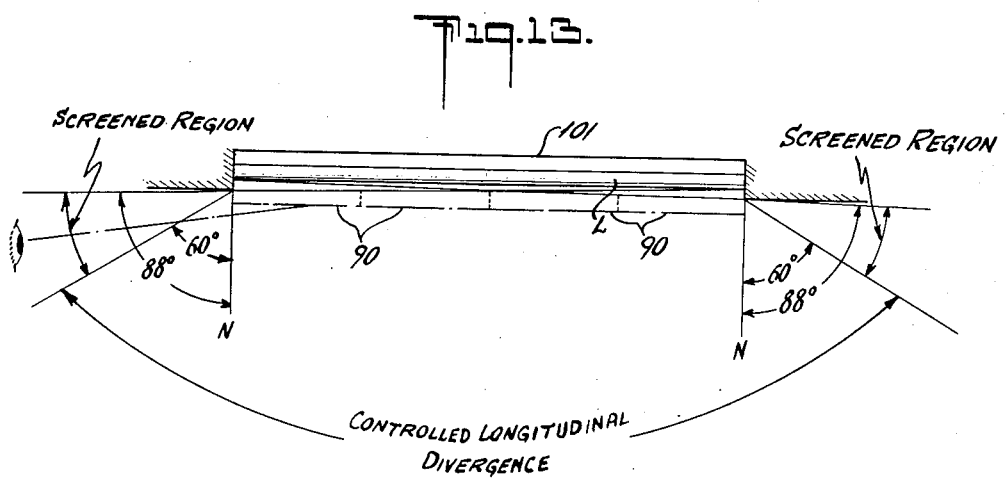

Figures 3 and 3a are respectively longitudinal and transverse diagrammatic views, which taken together illustrate optical phenomena occurring where light is received on the upper smooth surface of a refractor in a region defined by a longitudinally extending spherical wedge, Figure 3 being a longitudinal section taken on line 3—3 of Figure 3a and Figure 3a being a transverse section on the line 3a—3a of Figure 3;

Figure 4 is a diagrammatic view illustrating in perspective the internal light transmission in the refractor;

Figure 5 is a view similar to Figure 2 illustrating the emission of light in the longitudinal vertical plane and below the emergent surface of Figure 4;

Figure 6 is a diagram illustrating the relation between the suppression angle and the slope of a light emitting surface of such a refractor;

Figure 7 is a diagram illustrating the percent of light transmission at various longitudinal angles from the nadir in a horizontal plate with parallel sides and in a plate with horizontal upper surface and sloping lower surface of a predetermined angle;

Figure 8 is a transverse sectional view of the refractor illustrating more particularly optical phenomena occurring in transverse planes in a ribbed plate;

Figure 9 is a plot illustrating the range of slopes for the two surfaces of the prismatic ridges employed on the lower face of a plate wherein the totally reflecting action illustrated in Figure 8 can take place under the prescribed conditions;

Figure 10 is a transverse sectional view through a prior art luminaire illustrating the dominant light control effected thereby;

Figure 11 is a similar view through a comparable luminaire employing the prismatic construction described herein and illustrating the dominant light control effected thereby; and Figures 12 and 13 are diagrammatic transverse and longitudinal views through a complete luminaire.

In the drawings, the direct light is assumed to be coming from above the top of the refracting medium and to be emitted from the lower surface, except such light as is totally reflected in the medium and returned to the upper surface for reflection or transmission thereby. The upper incident surface is designated I and the lower or emergent surface E when parallel with the upper surface, and E' or E" where the surfaces slope.

Referring to Figure 1, which shows optical phenomena taking place in flat clear glass or the like, the point 20 is picked at random anywhere on the upper surface I of the plate P and it is assumed that the light is received in all directions as illustrated by the lightly stippled hemisphere 21. The base of the hemisphere is indicated by heavy stippling. The light upon entering the incident surface I of the transparent medium is compressed or concentrated into a cone 22 which in the case of a medium such as glass or any of the common plastics, with index of refraction of 1.5, will have an angle of spread in all azimuths of 84°, i. e., twice the critical angle of the medium. Its circular base is illustrated by heavy stippling. At the emergent surface E, the point 23 is also selected at random (the x at the center of the figure indicating that 23 may or may not be opposite 20). Point 23 will receive light through a cone 24 similar to the cone 22 and this light will be transmitted into a lightly stippled hemispherical region 25 similar to the hemispherical region 21 in which the light originated. This sketch of Figure 1 does not take into account the percent of light transmitted in the various directions.

From Figure 1 it will therefore be apparent that light from a linear source such as 26, Figure 2, will be transmitted through a plate with parallel incident and emergent surfaces I and E and emitted from a point 23' in a vertical plane v and extending from nadir N all the way up to the horizontal as indicated by the 90° markings. There will therefore be no suppression of light in longitudinal directions all the way up to the horizontal.

As light, however, is lost by surface reflections, the percent of transmission of light in this vertical plane of Figure 2 will vary with the angle from the nadir of the emergent ray. The curve 27 of Figure 7 illustrates the percent of transmission of light at the angles indicated in Figure 2, taking into account the losses at both surfaces.

While Figure 1 assumes that the light is arriving at the point 20 from all directions in a hemisphere 21, Figures 3 and 3a have been drawn to illustrate what takes place when the light reaches the randomly located point 30 on the incident surface in a region represented by a spherical wedge centered at the point 30 and defined by sloping lines 31 and 31', at angles of 60° to the normal (Fig. 3a) and whose surface is indicated by light stippling in Figures 3 and 3a.

In Figure 3, instead of being able to illustrate the light transmitted into the medium from the point 30 by a cone with circular base as in Figure 1, such light is now illustrated by a quasi-elliptical cone 32 which in longitudinal planes (Fig. 3) has the same apex angle as the cone 22, but in diagonal and transverse planes (Fig. 3a) has a lesser apex angle as determined by the condensing action taking place when the light in the wedge between planes 31 and 31' is bent toward the normal. At a 60° angle of incidence, index of refraction 1.5, the angle of refraction is about 35° and the apex angle 70°. In Figures 3 and 3a, the base of the cone 32 is illustrated by a heavily stippled figure which in Figure 3a falls inside dotted ellipse 24' representing the corresponding ellipse for the 84° cone appearing in Figure 1.

Light in this quasi-elliptical conical region falling on an emergent surface E parallel with I would (if displacements due to thickness were ignored) occupy a similar region and be transmitted, except for losses in a spherical wedge below the plate like that above. No light would be emitted outside the 120° wedge. The regions between the quasi-elliptical cones and the cones with apex angle 2C are, however, available for refractive transmission of light rays in either direction so that sighting ray paths exist through the plate from regions outside the emission wedge to those outside the incident wedge.

The action which takes place when the emergent surfaces are longitudinal and also slope differs markedly from that just mentioned. Tilting the emergent surfaces effects transverse deviation of portions of the rays emitted and brings about some total reflection, and these surfaces suppress transmission of certain other rays so that they do not pass through. The present invention relates to luminaires in which light control is effected solely by such tilted surfaces whereby it is possible to secure effective shielding of long wide sources such as a plurality of fluorescent lamps side by side, not only in longitudinal directions but in both transverse directions, as well as diagonally. It is thus possible to obtain shielding action analogous to that of crossed egg-crate louvers and provide a permanent, easily cleaned closure for the luminaire with fluorescent lamps and reflectors so that they remain clean.

Figures 4 to 9 show diagrammatically optical phenomena taking place in a refracting plate with a smooth incident surface I with 4° slope and an emergent surface with longitudinal ribs having surfaces E' sloping downwardly toward the right and E'' sloping downwardly toward the left.

In Figure 4, the thickness of the refractor is greatly exaggerated to provide room for construction lines, and the vanishing point of the perspective is selected midway between the upper and lower surfaces. The light source is above the refractor, and, as shown by the heavy dash lines, extends to the vanishing point. It is drawn close to the plate.

In Figure 4, light ray paths in the transverse plane T of the paper are illustrated by long dash lines. The double arrowed dash lines 33, 34, 35, 36, 37 illustrate reversible ray paths where total reflection is effected by surfaces E' and E''. Rays having two refractions are indicated by dash lines with single arrows 38—38', 39—39', 40—40'. The ribs have, owing to their slope, natural shielding angles for rays such as those beyond 39' sent across the nadir, and also have for rays such as 39', 40', bent toward nadir, a limited vertical angle from nadir less than they would have had, but for the fact that the transverse angle of incidence is limited by the position of the side edge of the source. This will be discussed more fully below.

Figure 4 also shows a transverse plane T' slightly beyond plane T and two vertical longitudinal planes V' intersecting a surface E' at the 90° line 41a, as shown, and V'' intersecting a surface E'' at the 90° line 42a shown. Transverse plane T' intersects E' at e' and E'' at e''. The vertical lines N indicate nadir. At points e' and e'' quasielliptical cones 41 and 42 are erected to show the bundle of rays originating in the source and falling on e' and e'', respectively. These cones resemble cone 32, Figs. 3 and 3a, in that in planes V' and V'' they have apex angles of 84° for ray paths along lines 41b, 42b and less apex angles in transverse plane T' and diagonal planes. These strike surface I at 41b' and 42b' and determine the location of plane T''. Ray paths from nadir in planes V' and V'' and in transverse plane T' are refracted as indicated at 43 and 44 and strike surface I in plane T', in the same manner as rays 38, 39, 40. Ray paths 43 and 44 are shown as intersecting at 46. Hence it is apparent that light from two different spots in the source is directed toward nadir by the emergent surfaces E' and E''.

Between planes T' and T'' are imaginary diagonal planes having longitudinal angles of slope less than the critical angle C with zenith or nadir, which light rays are adapted to traverse and fall on points such as e' and e''. No light is transmitted into any of these diagonal planes at angles greater than C from the normal at the incident surface, and, in the case of light from a spherical wedge as above discussed there are regions inside C which receive no refracted light through I and hence not all points on the surface I optically opposite vertical planes as V' and V'' through emergent surfaces receive light for transmission toward e' or e'' as the case may be.

The suppression angle may be defined as the angle in a longitudinal vertical plane V, Figure 5, above which a transversely sloping surface E' is unable to transmit light incident thereon from an upper horizontal incident surface I. As the slope of the surface E' increases from zero (as in Fig. 2), the suppression angle in a medium with index of refraction of 1.5 decreases from 90° from the nadir as shown by the line 45 in the diagram, Figure 6. A working range of slopes for suppression angles of 60° to 66° from the nadir, the region in which such suppression is highly desirable, is within a few degrees of 35°. The preferable range is 33° to 36°, but can range from 30° to 39°, giving suppression angles of from 60° to 66½°. In the drawings the slope of the emergent surfaces E' and E'' are arbitrarily set at 35° to the horizontal. This slope as shown in Figure 6 gives a suppression angle of 63°.

In Figure 7 the curve 37 shows the percent transmission of light at various angles to the nadir in the plane V, Fig. 5, for a surface of 35° slope. From this figure it will be apparent that no light is emitted beyond 63°. The percent transmission through the refractor with parallel surfaces (curve 27) and through the refractor with the ribbed lower surface is about the same up to about 35° for longitudinal angle A, and from Figure 7 it will be seen that at angles above about 60° the difference in transmission becomes very pronounced. Curves similar to curve 37 can be drawn falling to one side or the other of this curve depending upon the suppression angle selected. If, for example, a different suppression angle is selected for Figure 6, a different prism slope will be suitable and a curve similar to curve 37 to one side or the other side of this curve will result.

The glare zone is generally considered as commencing at approximately 60° from the nadir so that light should be suppressed as much as possible above this 60° angle from the nadir and more particularly in the higher angles such as above about 66°.

From the foregoing it will be seen that by a suitable adjustment of the slope of the emergent surfaces E' and E'', it is possible to obtain longitudinal suppression angles in the desired range. The effectiveness of such suppression angles in longitudinal directions is however not the sole consideration necessary in determining what slope angles should be used. An improper angle of slope of the surface E' or E'' can result in the emission of light transversely at such high angles as to build up brightness in transverse and diagonal directions.

Figure 8 illustrates at a larger scale the action which takes place in transverse directions, it being assumed, for reasons to be pointed out below, that prismatic rib 50 having emergent surfaces E' at 35° to the general profile of the plate and E'' having angles z to the same is so located relative to the light source as to receive light in a dihedral angle between longitudinal planes such as represented by the extreme ray 51 coming from the right and the extreme ray 52 coming from the left. The ray 51 is about 57½° from the vertical and the ray 52 about 15° from the vertical. Light ray 51 will be refracted in the direction indicated at 53 where it will fall on the surface E'' at 54. Part of this light will be transmitted with a natural shielding angle z, while another portion of the light will be internally reflected as indicated by the ray 55 where it falls on the surface E'. If the slope of E" has been properly selected, the light ray such as 55 will be totally reflected as indicated at 56 and transmitted upwardly as indicated by limiting ray 52. Increase in angle z will erect the transmitted ray into steeper angles than ray 52 and decrease will lower the ray into lower angles than ray 52.

Rays such as 57 may be refracted as indicated at 58 and strike surface E' of the adjacent ridge for transmission. The refractively transmitted light will have a natural screening angle of the slope of surface E'. Ray 60, parallel with 52, will be refracted as indicated at 61 and transmitted by surface E" in direction 62 toward nadir for useful down lighting.

A detailed analysis of all the rays between limiting rays 51 and 52 of Figure 8 accepted by the prism 50, will show that there is a range of slopes which may be employed for the two surfaces E' and E" of the prism. This is indicated by the plot, Figure 9, which shows a rhomboidally shaped figure 70, giving the range of angles which one emergent surface such as E' can have when the other emergent surface such as E" has the other angle, the index of refraction being 1.5. The slopes of the surfaces E' and E" must then be held within the area indicated by the rhomboid. For example, if the prism slope E" is to be 50°, the slope of E' would lie between 23° and 27°. Such a slope, however, is rather low to give optimum lateral shielding, for it would emit light up to 67° above the nadir laterally and 72° longitudinally. On the other hand, a prism slope at E" of 35° gives a prism slope for the surface E' ranging from about 31° to 35° so that it is possible to obtain with a prism slope of 35° the desired degree of both lateral and longitudinal control.

Glass used in illuminating glassware and certain of the plastics have an index of refraction of 1.5 and this is used in the calculations employed to arrive at the figures given above. An increase in the index of refraction greatly increases efficiency where total reflection is involved and here will permit the use of steeper angles of slope and make greater cut-off angles, i. e., angles nearer nadir.

Figure 10 illustrates a prior art multi-lamp fluorescent fixture with dished lens plate 80 having longitudinally extending regressed prisms 81 of increasing refracting power from the center outwardly and designed to reduce the divergence of the light rays. Such a fixture may be used with three (or sometimes 4) fluorescent lamps side by side, 3 lamps being indicated at L, L, L. The divergent light rays from these lamps, such as indicated at 82, 82, are refracted by the longitudinal prisms 81 of the plate 80 and emitted with less convergence as indicated by the rays 83, 83. Rays coming through the shallow central prisms of such a refracting plate create high brightnesses in longitudinal directions directly in line with the fixture all the way up to the horizontal, as explained in Figures 1 and 2. The brightnesses in transverse directions are built up by back reflections from the nominally inactive surfaces which connect the active surfaces of the prisms.

Figure 11 shows a luminaire with the same arrangement of lamps L, L, L as in Figure 10 and a prismatic light transmitting plate 90 of the same general shape, dimension and location as the plate 80. It differs from this plate in that over a region wide enough to be opposite the three lamps, and preferably wide enough to be opposite the four lamps which may be used, it does not have a regressed prism system such as shown in Figure 10, but instead it has a series of shallow longitudinally extending ridges 92, one of which, namely, the ridge 50, is shown in larger scale in Figure 8. While the portion of the refractor carrying the ridges 92 may be transversely flat, it is preferably in the form of an extremely wide V (apex angle 172°) as this provides a better appearance and slightly more advantageous angles of incidence for the light it receives, particularly in transverse planes. The light on ridge 50 is received in a region of 57½° to the left of the vertical to a region about 15° to the right of the vertical. Obviously, the limiting incident angles of the light from the extremes of a multi-lamp source on the refractor above any particular ridge will vary with the distance of that ridge from the center line and the vertical spacing.

The ribs are, for manufacturing reasons, preferably symmetrical. The optimum angle for each rib side varies with the position of the rib and the index of refraction, for example, with the 4° slope discussed for the plate surface, the angle of slope with respect to the 4° plane decreases from about 36° at the center of the plate to 33° at the outer double acting rib, the index of refraction being 1.5. With 1.59 index, the theoretical minimum slope is about 34° and the slopes may range from 37½° to 34½°. To all these ranges there is a permissible tolerance of plus or minus 3°.

The prismatic plates embodying the ribbed configurations above discussed may be of the physical size to be interchangeable with the light transmitting plates of Patents 2,474,308, and 2,474,341, and usable in the fixture structures of Patent 2,474,308 or application Serial No. 648,131 filed February 16, 1946, Patent No. 2,520,596.

Salient features of such fixture constructions together with the relation of the same to the new refracting plates are illustrated in Figures 12 and 13. The lamps L, L, L are received in the reflecting trough. In the transverse section, Figure 12, the line 100 shows the boundary of the fixture body, while in Figure 13 the longitudinal cross-sectional shape of a 4 foot fixture is shown by the line 101. Such a fixture body may conveniently provide a window approximately 12½ inches wide by 48 inches long which is approximately ¾ inch below the level of the lamps. If no light controlling plate were provided, light could escape transversely up to angles of about 83° from the nadir and longitudinally up to angles about 88° from the nadir. Where the fixture length increases by adding more sections, the longitudinal angle in the absence of partitions approaches 90°, and it may be reduced by end plate construction of the fixture to approximately 86°.

The refracting plates shown herein are well suited to control the light which would escape all the way from nadir up to these angles of 83°, or more, from the nadir in such a manner that nearly all the light is transmitted at angles of less than 60° from the nadir. In transverse planes, light falls on the steeper portions of the side walls of the closure plates through an angle of about 15° and is refracted downwardly as indicated by the rays 83 (Figs. 10 and 12). The longitudinally ribbed section 92 of the new plate lies between these curved side portions and receives the dominant downwardly proceeding light and reduces its divergence so that it is within the 60° angle from nadir as above discussed. Some light of course is scattered about inside the fixture and reaches the plates at angles beyond those above discussed, but the amount of light which is involved is so small that it does not contribute substantially to the brightness.

Comparative tests have shown that in the region of from about 60 to 70 degrees from the nadir, the brightnesses in longitudinal directions have been reduced in the order of 55%, compared with those which were found with the similar prior art plate. This has been accompanied by considerable reduction of brightness in regions above 70° longitudinally as well as in all transverse and diagonal directions in these high angles from the nadir.

Since it is obvious that the invention may be embodied in other forms and constructions within the scope of the claims, we wish it to be understood that the particular form shown is but one of these forms, and various modifications and changes being possible, we do not otherwise limit ourselves in any way with respect thereto.

What is claimed is:

1. In combination, a horizontal rectilinear light source having its side edges at predetermined positions in space, a longitudinally extending refractor under the source and having an upper flat surface and a lower surface consisting of contiguous straight sided ribs so that a rectilinear region optically opposite each rib surface receives light in a dihedral plane at a uniform transverse angle of incidence on one side of the normal from one edge of the source and at a uniform angle of incidence on the other side of the normal from the other edge of the source, the light refracted at the upper surface falling on the lower surface for refraction or reflection, the rib surfaces each having a natural screening angle in one transverse direction to limit the transmission of light to corresponding angles above the nadir, each rib surface and the optically opposite upper surface having a suppression angle in a longitudinal vertical plane above which light is not transmitted and a maximum angle above the nadir for the transmission of light originating in the source, the two surfaces of a rib and the opposed upper surface forming a reflecting prism in transverse planes for light falling on the upper surface beyond substantially the limit of the dihedral plane, the said surfaces being mutually optically cooperative to produce substantially the same cutoff angle above the nadir in both transverse directions and longitudinally.

2. In combination, a horizontal light source of finite width and indeterminate length, a refracting medium below the source and generally parallel with the source and having an upper surface on the points of which light rays from the source are concentrated on entry into a conical region of quasi-elliptical cross-section with its maximum apex angle in the longitudinal vertical plane substantially 2C, where C is the critical angle, said conical region being inside an imaginary coaxial cone of common apex and uniform apex angle of 2C, and a lower surface in the form of straight sided contiguous ribs parallel with the source, which have natural screening angles in transverse vertical planes corresponding with their slope and which transmit refractively light received at points thereon from the upper surfaces in conical regions of corresponding quasi-elliptical cross-section and totally reflected light falling thereon outside conical regions of apex angle of 2C and with axis normal to the rib surfaces, the oblique surfaces of the ribs having such angles of obliquity that reversed light ray paths in the refractor, corresponding with ray paths from below and having angles from the nadir in any azimuth substantially greater than the said natural screening angle, traverse a region outside one or the other of the optically opposed quasi-elliptical conical regions transmitting light from the source through the refractor whereby the source affords no starting point for luminous rays and the sloping surfaces discriminate against light incident at the upper surface from beyond the region occupied by the light source.

3. A refractor for use below a plurality of horizontal, rectangular, tubular lamps arranged side by side to provide an elongated luminous source of multilamp width, the refractor having a width and length at least as great as the width and length of the source so that when close to the source, points thereon receive light throughout a region bounded by the sides of longitudinally extending spherical wedges extending through the points, the refractor having a substantially horizontally smooth upper, or light incident, surface which refractively transmits the light and condenses the rays thereof into a conical region with an apex angle in longitudinal planes of 2C (where C is the critical angle of the medium) and apex angles in diagonal and transverse planes as determined by the refractive deviation of the rays, and a lower light emergent surface composed of longtudinally-extending, straight-sided, relatively-narrow contiguous ribs presenting intercepting surfaces in oblique planes so that normals to the surfaces are tilted transversely and light rays incident on said lower surfaces are, except for the light lost due to internal reflections, deviated laterally so as to have different angles measured both transversely and laterally from the corresponding rays incident on the upper surface, the slopes of the emergent surfaces being such that for incident light in a wedge confined within 60° from a longitudinal normal plane, the mutually cooperative optically opposite surfaces inhibit transmission of light rays in vertical longitudinal planes above angles from 60° to 66° from the nadir whereby in such region the sources may be substantially completely obscured.

4. Means for effecting a cutoff of light emission downwardly in a vertical plane above angles of substantially 60° to 66° from the nadir from an elongated horizontal light source of substantial width comprising a refractor extending generally parallel with the source so that points thereon receive light in a longitudinally extending spherical wedge with a maximum angle from the zenith measured transversely of about 60°, the refractor having a smooth upper surface to transmit the light through points on the surface thereof into the plate in elongated conical regions with a longitudinal apex angle of 2C, where C is the critical angle, whereby certain regions inside a circular cone of corresponding apex angle receive no light, and a lower surface in the form of a series of relatively narrow, longitudinal, straight sided ridges each of which receives a narrow band of light refracted by the upper surface for deviation of the rays thereof both laterally and longitudinally, the slope of the ridge surfaces being such that oblique upwardly proceeding ray paths in the refractor corresponding with ray paths below the refractor in the longitudinal vertical plane above 60° to 66° from the nadir have greater angles of incidence to the upper surface than the refractively transmitted light in the corresponding oblique plane so that no light is transmitted downwardly along said ray paths.

5. The combination with an elongated horizontal light source of substantial width which when viewed lengthwise from underneath presents a long, receding source of brightness of substantial width with angles of observation in the upper glare zone, of a transparent refractor parallel with the source and interposed in the line of sight so as to become a secondary light source, the refractor having an upper, light incident surface accepting and transmitting into the medium thereof all of the light falling thereon except for surface reflection losses, and light emergent surfaces onto which downwardly proceeding light in the medium falls, the light emergent surfaces being in the form of longitudinally extending, straight sided, contiguous ridges which refractively transmit light rays falling thereon within the critical angle of the medium not only with altered longitudinal angles from the nadir, but with altered transverse angles from the nadir and on both sides of the longitudinal vertical sighting plane so that a portion of the rays are emitted in and near said sighting plane, the refracting surfaces for rays in and near said sighting plane being mutually optically cooperative to transmit direct rays from the source in said plane only up to angles of about 60° to about 66° from the nadir so as to obscure the brightness of the source when viewed at angles greater than about 60° to 66° to the nadir in said sighting plane.

6. In combination, an elongated horizontal light source of substantial width, an elongated refractor of at least the width of the source extending parallel with the source and spaced below it to intercept all light rays emitted downwardly in vertical planes and at a distance to intercept transversely emitted light rays between angles of from about ±15° to about ∓60° from the nadir, the refractor having a smooth light incident surface and a lower light emergent surface composed of a plurality of straight sided, longitudinally extending ribs at slopes between 30° and 39° to provide natural shielding angles of 51° to 60° from the nadir in transverse directions of corresponding value, and to totally reflect back into the refractor a portion of the light falling thereon to limit the refractedly transmitted light.

7. A luminaire comprising an elongated wide light source and a refracting plate spaced below the source and of the length and width of the source so that points thereon receive light at transverse angles of convergence of up to substantially 72°, and longitudinal angles of convergence of substantially 180°, and a lower surface composed of contiguous ribs with sloping sides, so that one side of a rib is predominantly a refracting surface for light originating in the source to one side of the normal in remote lateral regions and the other side of the rib provides a reflecting surface for light from the same remote lateral regions and vice versa for light originating on the other side of the normal, the angles of slope for such refractive medium being such when the angle of slope of the predominantly reflecting surface is plotted on the $x$ axis and the angle of slope of the other surface on the $y$ axis, the said angles fall within a rhomboidal figure having at its corners substantially the following values, for a medium with index of refraction of 1.5, : $x28°-y40°$, $x52°-y27°$, $x54°-y21°$, and $x32°-y32°$, and correspondingly varied values for media with other indices of refraction.

8. The combination with light sources mounted overhead for direct lighting and of extended length and substantial width and adapted to present long sources of brightness above the horizontal whether observed transversely or lengthwise thereof, of shallow dish shaped refractors of the same extended length and uniform cross section transversely, the refractors having inwardly concave side portions which intercept transversely emitted light up to substantially 83° above the nadir and substantially flat bottom portions, the side portions having longitudinally extending downwardly refracting prisms which deviate the direct light downwardly so as to intensify downward light flux and reduce the brightness of the side portions in lateral directions and effect a cutoff of light in longitudinal directions, the bottom portions of the refractors having longitudinally extending V-shaped symmetrical refracting ribs which make angles of from 30° to 39° with the horizontal, refractively deviate the light laterally away from the nadir and effect a cutoff of light in longitudinal directions at angles of from 60° to 66° above the nadir.

9. Lighting apparatus comprising elongated horizontal fluorescent lamps side by side so as to provide a long source of brightness of substantial width, a horizontal light emitting window of the length of the sources, substantially wider than the sources at an elevation such as to allow direct light to radiate laterally at angles up to about 83° above the nadir and longitudinally at angles up to about 88° above the nadir whereby widely divergent light escapes downwardly in all azimuths, and a refractor for deviating the more widely divergent transversely emitted light toward nadir and reducing the brightness of the apparent source at angles above about 60° in all azimuths, said refractor having a smooth upper surface, inwardly concave sides of about 15° angular width measured against the remote side of the source with external, relatively deep, longitudinally extending prisms which refractively transmit light into regions about 50° from the nadir, laterally shield the sources and reduce the brightness at higher angles, and a substantially flat bottom having on its lower surface relatively deep, longitudinally extending V-shaped ribs making angles of about 30° to about 39° with the horizontal whereby transversely spreading light falling thereon and refractively transmitted is spread laterally from the nadir at angles below 51° to 60° from the nadir and direct light spreading longitudinally undergoes substantially no lateral deviation but is cut off by internal reflections at angles above about 60° to 66° from the nadir.

10. A luminaire comprising a long horizontal light source including at least three parallel fluorescent lamps side by side so that the source has substantial width, a horizontal light transmitting plate below the source at least as wide as the source and close to the source, so that rays from the source fall on the opposed plate surface with longitudinal angles of incidence of nearly 90° and with transverse angles of incidence of a maximum of approximately 60°, the plate having on its lower surface straight sided contiguous longitudinal ribs which provide in each lateral direction natural screening angles corresponding to their slope, which mutually optically cooperate with the upper surface to transmit light by two refractions into directions nearer nadir than the incident light from the source, to totally reflect other light proceeding transversely so that none of the light from the source falls on a rib surface for transmission thereby at angles above the screening angle of the adjacent rib surface, and to suppress longitudinal transmission at angles above substantially 60° to 66° from the nadir, the values of angles of slope of said ribs varying with the index of refraction of the medium.

THOMAS W. ROLPH.
KURT FRANCK.

References Cited in the file of this patent

UNITED STATES PATENTS

| Number | Name | Date |
|---|---|---|
| 2,474,308 | Franck et al. | June 28, 1949 |
| 2,474,317 | McPhail | June 28, 1949 |

OTHER REFERENCES

Holophane Catalog CL-1 SM-48-1948, page 12 relied on. (Copy in Division 65.)